(12) United States Patent
Sakuma et al.

(10) Patent No.: US 12,500,537 B2
(45) Date of Patent: Dec. 16, 2025

(54) MOTOR DRIVE CONTROL DEVICE AND MOTOR UNIT

(71) Applicant: MINEBEA MITSUMI Inc., Nagano (JP)

(72) Inventors: Tomotaka Sakuma, Nagano (JP); Masaaki Nishizawa, Nagano (JP); Masashi Muragi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 182 days.

(21) Appl. No.: 18/583,010

(22) Filed: Feb. 21, 2024

(65) Prior Publication Data

US 2024/0291411 A1 Aug. 29, 2024

(30) Foreign Application Priority Data

Feb. 27, 2023 (JP) .................................. 2023-028403

(51) Int. Cl.
  *H02P 21/36* (2016.01)
  *H02P 21/00* (2016.01)
  *H02P 25/03* (2016.01)
  *H02P 27/08* (2006.01)

(52) U.S. Cl.
  CPC .......... *H02P 21/36* (2016.02); *H02P 21/0003* (2013.01); *H02P 25/03* (2016.02); *H02P 27/08* (2013.01)

(58) Field of Classification Search
  CPC ...... H02P 21/0003; H02P 21/36; H02P 25/03; H02P 27/08
  See application file for complete search history.

(56) References Cited

U.S. PATENT DOCUMENTS

| | | | | | |
|---|---|---|---|---|---|
| 5,170,105 | A | * | 12/1992 | Kumar | B60L 7/22 318/362 |
| 6,005,359 | A | * | 12/1999 | Brambilla | G11B 19/22 318/368 |
| 7,075,257 | B2 | * | 7/2006 | Carrier | H02P 3/12 318/470 |
| 8,781,786 | B2 | * | 7/2014 | Huam | H02P 6/18 702/65 |
| 10,804,822 | B2 | * | 10/2020 | Alcorn | H02P 6/24 |

FOREIGN PATENT DOCUMENTS

JP 2005-269808 A 9/2005

* cited by examiner

*Primary Examiner* — Thai T Dinh
(74) *Attorney, Agent, or Firm* — Chrisman Gallo Tochtrop LLC

(57) ABSTRACT

A motor drive control device includes a control circuit generating a drive control signal, and a drive circuit driving a motor. The drive circuit includes a plurality of switching legs each including a high-side transistor and a low-side transistor connected in series between a power line and a ground potential, and pull-up resistors each connected between the power line and a control electrode of the low-side transistor. The control circuit performs brake control to generate a drive control signal for turning off the high-side transistor and periodically switching the low-side transistor, when detecting a power supply voltage to be lower than a threshold voltage.

5 Claims, 6 Drawing Sheets

MOTOR DRIVE CONTROL DEVICE AND MOTOR UNIT

CROSS-REFERENCE TO RELATED APPLICATIONS

This application claims the benefit of priority to Japanese Patent Application Number 2023-028403 filed on Feb. 27, 2023. The entire contents of the above-identified application are hereby incorporated by reference.

TECHNICAL FIELD

The disclosure relates to a motor drive control device and a motor unit.

BACKGROUND

It is desired that a motor, such as a brushless DC motor mounted in a fan, is stopped in a short amount of time during a power shutdown or the like. In order to quickly stop rotation of the motor, a technique is known for turning on a low-side transistor constituting an inverter circuit for driving the motor, thus braking the motor.

In addition, since a fan motor requires components for controlling the motor to be mounted within a limited space on a control board, the size of these individual components is preferably small. For example, JP 2005-269808 A discloses a booster circuit for boosting an operating voltage of a power line to generate a booster voltage being provided, and the low-side transistor being turned on by applying the booster voltage to a gate of the low-side transistor.

SUMMARY

However, the technique disclosed in JP 2005-269808 A requires a booster circuit generating a voltage larger than a power supply voltage in order to control the low-side transistor. Some booster circuits are composed of a plurality of capacitors, and integrated circuits (IC) for controlling boosting operation. Since components for controlling the motor need to be mounted in the fan motor in a limited amount of space on the control board, it is assumed it is difficult to arrange a booster circuit for generating a booster voltage different from the power supply voltage on the control board in order to control the on/off of the transistor for driving the coil, and improvement has been desired.

Thus, prior to the present application, the present inventors have examined a new motor drive control device for easily arranging components for controlling the motor and capable of quickly stopping the motor during the power shutdown while driving the motor with high efficiency.

Specifically, the motor drive control device according to the prior examination example by the present inventors includes an inverter circuit for driving the motor, a pre-drive circuit for driving the inverter circuit, and a control circuit composed of a microcontroller generating a drive control signal for controlling the drive of the motor and control the pre-drive circuit. Here, the control circuit operates by a power supply voltage (e.g., 5 V) supplied from a first power line, and the pre-drive circuit and the inverter circuit operate through the power supply voltage (e.g., 12 V) supplied from a second power line.

In the motor drive control device of the prior examination example, the pre-drive circuit converts (level shifts) the signal level of the drive control signal output from the control circuit to a signal level based on the power supply voltage (12 V) higher than the power supply voltage (5 V) of the control circuit, and drives a high-side transistor and the low-side transistor of the inverter circuit.

Since this makes it possible to reduce the on resistance of the high-side transistor and the low-side transistor, the motor can be driven with high efficiency. This level shift conversion is achieved by adding a resistor between a control electrode (for MOS transistor, the gate electrode) of the low-side transistor and the power supply voltage (e.g., 12 V). Thus, the power supply voltage can be applied to the control electrode of the low-side transistor by a resistor requiring a relatively small area on the control board.

Furthermore, since the low-side transistor can be forcibly turned on by a pull-up resistor during the power shutdown, it is possible to quickly stop the motor by strongly braking the motor.

However, further investigation by the present inventors has revealed that the motor drive control device of the prior examination example has the following problems.

Specifically, when the power of the motor drive control device of the prior examination example is shut down, since the voltage (5 V) of the first power line of the control circuit drops faster than the voltage (12 V) of the second power line of the pre-drive circuit and the inverter circuit, the power supply to the control circuit stops and the control circuit becomes inoperable before the voltage of the second power line drops sufficiently.

As a result, the supply of the drive control signal from the control circuit to the pre-drive circuit is stopped, and the driving of the inverter circuit by the pre-drive circuit is stopped. At this time, since the control electrode of the low-side transistor of the inverter circuit is connected to the power line (12 V) via the pull-up resistor, the low-side transistor is turned on. This strongly brakes (short brake) the motor.

In general, the current flowing through the coil of the motor when the motor is braked (hereinafter also referred to as "brake current") increases as the rotation speed increases when the motor is braked. In the prior examination example, when the motor is braked, the rotation speed of the motor is not sufficiently reduced and the voltage of the power line (12 V) is not sufficiently reduced. Thus, the present inventors have found a problem that after the operation of the control circuit is stopped, a very large brake current flows through the low-side transistor with the control electrode pulled up to the power line, causing the low-side transistor to become very hot.

The disclosure is for eliminating at least the problems described above, and the object of the disclosure is to easily arrange components for controlling the motor in a limited amount of space on the control board, and suppress the brake current while quickly stopping the motor during the power shutdown.

A motor drive control device according to a representative embodiment of the disclosure includes: a control circuit configured to output a drive control signal for driving a motor, the motor including multiphase coils; and a drive circuit configured to drive the multiphase coils based on the drive control signal output from the control circuit. The drive circuit includes an inverter circuit including a plurality of switching legs configured to drive the multiphase coils, pull-up resistors, and a pre-drive circuit. Each of the plurality of switching legs includes a high-side transistor and a low-side transistor connected in series between a power line supplying a power supply voltage and a ground potential. A node for commonly connecting the low-side transistor and the high-side transistor is connected to one end of a corresponding one of the multiphase coils. The low-side transistor and the high-side transistor each include a control electrode controlling an on/off of the low-side transistor and the high-side transistor. The pull-up resistors are connected between the control electrode of the low-side transistor and the power line. The pre-drive circuit drives the control electrode of the low-side transistor and the control electrode of the high-side transistor in response to the drive control signal. The control circuit performs brake control to generate the drive control signal for turning off the high-side transistor and periodically switching the low-side transistor in each of the plurality of switching legs, when detecting the power supply voltage to be lower than a threshold voltage.

According to one aspect of the disclosure, the components for controlling the motor can be easily arranged in a limited amount of space on the control board, and the brake current can be suppressed while the motor is quickly stopped during the power shutdown.

DESCRIPTION OF EMBODIMENTS

1. Overview of Embodiments

Figure 1:
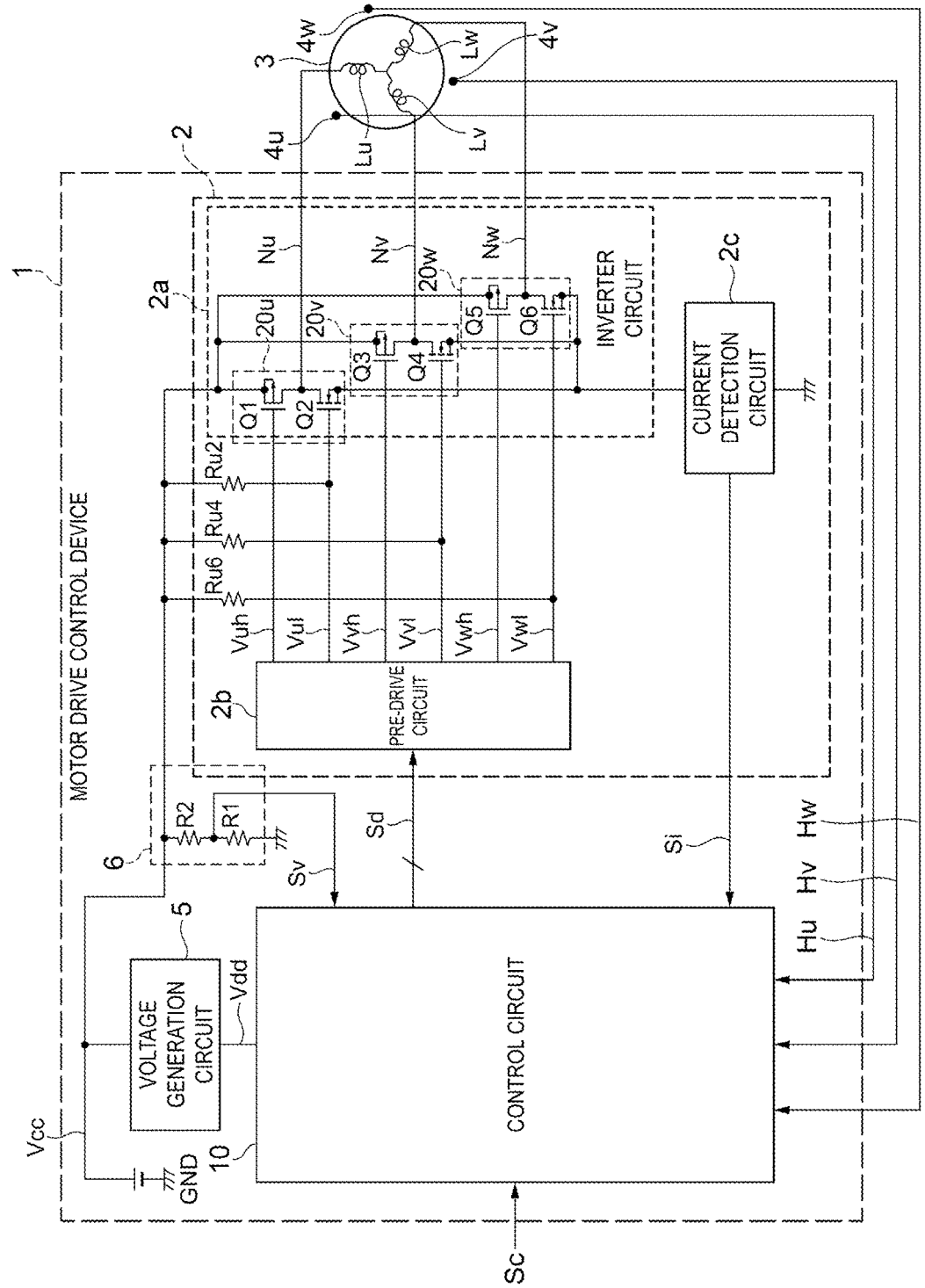
FIG. 1 is a diagram illustrating a configuration of a motor unit including a motor drive control device according to an embodiment.

First, an overview of typical embodiments of the invention disclosed herein will be described. In the following description, by way of example, reference numerals on the drawings corresponding to the components of the invention are indicated in parentheses.

[1] A motor drive control device (1) according to a representative embodiment of the disclosure includes: a control circuit (10) configured to output a drive control signal (Sd) for driving a motor (3), the motor including multiphase coils (Lu, Lv, Lw); and a drive circuit (2) configured to drive the multiphase coils based on the drive control signal output from the control circuit. The drive circuit includes: an inverter circuit (2a) including a plurality of switching legs (20u, 20v, 20w) configured to drive the multiphase coils; pull-up resistors (Ru2, Ru4, Ru6); and a pre-drive circuit (2b). Each of the plurality of switching legs includes a high-side transistor (Q1, Q3, Q5) and a low-side transistor (Q2, Q4, Q6) connected in series between a power line (Vcc) for supplying a power supply voltage (Vcc) and a ground potential (GND). A node (Nu, Nv, Nw) for commonly connecting the low-side transistor and the high-side transistor is connected to one end of a corresponding one of the multiphase coils. The low-side transistor and the high-side transistor each include a control electrode (Vuh, Vul, Vvh, Vvl, Vwh, Vwl) for controlling an on/off of the low-side transistor and the high-side transistor. The pull-up resistors are connected between the control electrode of the low-side transistor and the power line. The pre-drive circuit drives the control electrode of the low-side transistor and the control electrode of the high-side transistor, in response to the drive control signal. The control circuit performs brake control to generate the drive control signal for turning off the high-side transistor and periodically switching the low-side transistor in each of the plurality of switching legs, when detecting the power supply voltage to be lower than a threshold voltage (Vth).

[2] In the motor drive control device according to the above [1], the control circuit may continue the brake control from detecting the power supply voltage to be lower than the threshold voltage until the control circuit becoming inoperable.

[3] In the motor drive control device according to the above [1], the control circuit may continue the brake control for a predetermined period from detecting the power supply voltage to be lower than the threshold voltage.

[4] In the motor drive control device according to any one of the above [1] to [3], a signal, among the drive control signal for turning off the high-side transistor and periodically switching the low-side transistor, for driving the low-side transistor has a duty ratio of 50% or less.

[5] A motor unit (100) according to a representative embodiment of the disclosure includes the motor drive control device according to any one of the above [1] to [4] and the motor (3).

2. Specific Examples of Embodiments

Hereinafter, specific examples of embodiments of the disclosure will be described with reference to the drawings. In the following description, the same reference numerals are used for the common components in each embodiment, and the repeated descriptions are omitted.

Embodiments

FIG. 1 is a diagram illustrating a configuration of a motor unit 100 including a motor drive control device 1 according to an embodiment.

As illustrated in FIG. 1, the motor unit 100 includes a motor 3 and the motor drive control device 1 for controlling rotation of the motor 3. The motor unit 100 can, for example, be applied to various devices using the motor as a driving source, such as, a fan.

The motor 3 is, for example, a permanent magnet synchronous motor. In the present embodiment, the motor 3 is a brushless DC motor having, for example, three-phase coils Lu, Lv, and Lw. The coils Lu, Lv, and Lw are Y-connected to each other, for example.

The motor drive control device 1 rotates a rotor of the motor 3 by driving the three-phase coils Lu, Lv, and Lw of the motor 3. For example, the motor drive control device 1 applies a sinusoidal drive signal to the motor 3, and periodically flows a sinusoidal phase current to the three-phase coils Lu, Lv, and Lw of the motor 3 to rotate the rotor.

The motor drive control device 1 includes, for example, a control circuit 10, a drive circuit 2, a voltage generation circuit 5, and a voltage detection circuit 6.

Note that the components of the motor drive control device 1 illustrated in FIG. 1 are only a part of the entire motor drive control device 1, and the motor drive control device 1 may include other components in addition to the components illustrated in FIG. 1.

The voltage generation circuit 5 is a circuit generating the power supply voltage of the control circuit 10. The voltage generation circuit 5 generates a DC voltage based on, for example, an externally supplied DC voltage Vcc supplied to the control circuit 10 as a power supply voltage. For example, the voltage generation circuit 5 lowers the DC voltage Vcc (e.g., 12 V) and generates a DC voltage Vdd (e.g., 5 V). The voltage generation circuit 5 includes, for example, a power supply circuit such as a series regulator or a switching regulator.

The DC voltage Vcc is supplied as the power supply voltage of the drive circuit 2. The DC voltage Vdd is supplied as the power supply voltage of the control circuit 10 as described above. For example, Vdd<Vcc.

Hereinafter, the DC voltage Vcc may be referred to as a "power supply voltage Vcc" and the DC voltage Vdd may be referred to as a "power supply voltage Vdd". The wiring to be supplied with the power supply voltage Vcc may be represented as a "power line Vcc" and the wiring to be supplied with the power supply voltage Vdd may be represented as a "power line Vdd".

The voltage detection circuit 6 detects the power supply voltage Vcc of the drive circuit 2. The voltage detection circuit 6 includes, for example, a resistor voltage divider circuit connected between the power line Vcc and a ground potential GND. For example, as illustrated in FIG. 1, the resistor voltage divider circuit is formed by a resistor R1 and a resistor R2 connected in series between the power line Vcc and the ground potential GND. The voltage detection circuit 6 outputs the voltage obtained by dividing the power supply voltage Vcc, as a voltage detection signal Sv.

A division ratio based on the resistors R1 and R2 is only required to be adjusted so that the signal level (voltage) of the voltage detection signal Sv can be input to the control circuit 10. Moreover, the circuit configuration of the voltage detection circuit 6 is not limited to the above example, and various circuit configurations capable of generating a signal indicating the magnitude of the power supply voltage Vcc can be employed.

The drive circuit 2 drives the motor 3 based on a drive control signal Sd output from the control circuit 10. The drive circuit 2 includes, for example, an inverter circuit 2a, a pre-drive circuit 2b, a current detection circuit 2c, and pull-up resistors Ru2, Ru4, and Ru6.

The inverter circuit 2a is a circuit arranged between the power line Vcc (power supply voltage Vcc) and the ground potential, and drives the multiphase coils Lu, Lv, and Lw of the motor 3 as a load, based on the input drive control signal Sd.

Specifically, the inverter circuit 2a includes a switching leg including at least two drive transistors connected in series, and the two drive transistors alternately perform an on/off operation (switching operation) based on the input drive control signal Sd, driving the coils Lu, Lv, and Lw of the motor 3 as a load.

More specifically, the inverter circuit 2a includes switching legs 20u, 20v, and 20w respectively corresponding to the U, V, and W-phases of the motor 3.

For example, as illustrated in FIG. 1, the switching leg 20u corresponding to the U-phase includes two drive transistors Q1 and Q2 connected in series between the power line Vcc and the ground potential GND via the current detection circuit 2c. A node Nu commonly connecting the drive transistor Q1 and the drive transistor Q2, is connected to one end of the coil Lu as a load.

The switching leg 20v corresponding to the V-phase includes two drive transistors Q3 and Q4 connected in series between the power line Vcc and the ground potential GND via the current detection circuit 2c. A node Nv commonly connecting the drive transistor Q3 and the drive transistor Q4 is connected to one end of the coil Lv as a load.

The switching leg 20w corresponding to the W-phase includes two drive transistors Q5 and Q6 connected in series between the power line Vcc and the ground potential GND via the current detection circuit 2c. A node Nw commonly connecting the drive transistor Q5 and the drive transistor Q6 is connected to one end of the coil Lw as a load.

The drive transistors Q1 to Q6 each include a control electrode for controlling the drive (on/off) of the drive transistors Q1 to Q6. The drive transistors Q1, Q3, and Q5 are, for example, P-channel MOSFETs, and gate electrodes of the transistors are respectively the control electrodes Vuh, Vvh, and Vwh. The drive transistors Q2, Q4, and Q6 are, for example, N-channel MOSFETs, and gate electrodes of the transistors are respectively the control electrodes Vul, Vvl, and Vwl. The drive transistors Q1 to Q6 may be other types of transistors such as an Insulated Gate Bipolar Transistor (IGBT).

Hereinafter, the drive transistors Q2, Q4, and Q6 are also referred to as "low-side transistors Q2, Q4, Q6" and the drive transistors Q1, Q3, and Q5 are referred to as "high-side transistors Q1, Q3, and Q5". In addition, Vuh, Vvh, Vwh, Vul, Vvl, and Vwl are assumed to indicate not only the control electrodes but also the drive signals (voltage) applied to the respective control electrodes.

The pull-up resistors Ru2, Ru4, and Ru6 are resistors for pulling up the control electrodes of the low-side transistors Q2, Q4, and Q6 to the power supply voltage Vcc. Specifically, the pull-up resistor Ru2 is connected between the control electrode Vul of the low-side transistor Q2 and the power line Vcc. The pull-up resistor Ru4 is connected between the control electrode Vvl of the low-side transistor Q4 and the power line Vcc. The pull-up resistor Ru6 is connected between the control electrode Vwl of the low-side transistor Q6 and the power line Vcc.

The pull-up resistors are respectively connected between the control electrodes Vuh, Vvh, and Vwh of the high-side transistors Q1, Q3, and Q5 and the power line Vcc, but the pull-up resistors are not illustrated in FIG. 1.

The pre-drive circuit 2b drives the control electrodes Vuh, Vvh, Vwh, Vul, Vvl, and Vwl of the respective drive transistors Q1 to Q6 in response to the drive control signal Sd output from the control circuit 10.

Here, the drive control signal Sd is a signal for controlling the drive of the motor 3, for example, a Pulse Width Modulation (PWM) signal. Specifically, the drive control signal Sd is a signal for switching the energization pattern of the coils Lu, Lv, and Lw of the motor 3 determined by the on/off status of the respective drive transistors Q1 to Q6 constituting the inverter circuit 2a. More specifically, the drive control signal Sd includes six types of PWM signals corresponding to the respective drive transistors Q1 to Q6 of the inverter circuit 2a.

The pre-drive circuit 2b generates six types of drive signals Vuh, Vul, Vvh, Vvl, Vwh and Vwl for providing sufficient power to drive the control electrodes (gate electrodes) of the respective drive transistors Q1 to Q6 of the inverter circuit 2a based on the six types of PWM signals as the drive control signal Sd supplied from the control circuit 10.

The respective drive transistors Q1 to Q6 perform on/off operation (switching operation), inputting these drive signals Vuh, Vul, Vvh, Vvl, Vwh, and Vwl to the control electrodes (gate electrodes) of the respective drive transistors Q1 to Q6 of the inverter circuit 2a. For example, the high-side transistors Q1, Q3, and Q5 of the upper arm and the low-side transistors Q2, Q4, and Q6 of the lower arm of the switching legs corresponding to the respective phases alternately turn on and off. As a result, power is supplied from the power line Vcc to the coil of each phase of the motor 3, and the motor 3 rotates.

The pre-drive circuit 2b may be provided in the control circuit 10.

The current detection circuit 2c is a circuit for detecting the current flowing in the multiphase coils Lu, Lv, and Lw of the motor 3. The current detection circuit 2c detects the current (phase current) flowing through the coils Lu, Lv, and Lw of the respective phases and outputs a current detection signal Si corresponding to the detected current.

The current detection circuit 2c is connected in series with the inverter circuit 2a, for example, and outputs a signal indicating the phase current of each of the coils Lu, Lv, and Lw as the current detection signal Si.

For example, the current detection circuit 2c includes at least one resistor (shunt resistor) as a current detection element. The shunt resistor is connected in series with the inverter circuit 2a, for example, between the power line Vcc and the ground potential (single shunt method). In the present embodiment, as an example, the shunt resistor as the current detection circuit 2c is connected to the negative side (ground side) of the inverter circuit 2a. In the current detection circuit 2c, each phase current of the coils Lu, Lv, and Lw of the motor 3 is converted to a voltage by the above-described resistor, and the voltage is input to the control circuit 10 as the current detection signal Si.

A position sensor 4 is a device for detecting the rotation position of the rotor of the motor 3. The position sensor 4 outputs a signal corresponding to the rotation position of the rotor. The position sensor 4 is, for example, a Hall element. FIG. 1 illustrates, as an example, Hall elements as position sensors 4u, 4v, and 4w being respectively provided for the U-phase, V-phase, and W-phase of the motor 3. Hereinafter, the position sensors 4u, 4v, and 4w are also referred to as "Hall elements 4u, 4v, and 4w".

The Hall elements 4u, 4v and 4w are arranged around the rotor of the motor 3 at approximately equal intervals (e.g., an interval of 120 degrees between adjacent Hall elements) from each other, for example. The Hall elements 4u, 4v, and 4w detect the magnetic poles of the rotor, and respectively output Hall signals with voltage changing according to the rotation of the rotor as rotation position detection signals Hu, Hv, and Hw. The rotation position detection signal Hu, Hv, and Hw are input to the control circuit 10.

The control circuit 10 may be configured such that, instead of the hole signal, other signals corresponding to the rotational position of the rotor of the motor 3 are input as the rotation position detection signals. For example, an encoder, a resolver, or the like may be provided for inputting the detection signal to the control circuit 10.

The control circuit 10 is a circuit generating the drive control signal Sd for controlling the drive of the motor 3. The control circuit 10 generates the drive control signal Sd for driving the motor 3 based on, for example, an externally input drive command signal Sc for indicating the target state of the operation of the motor 3, and controls the driving of the motor 3. For example, the control circuit 10 monitors the rotation state of the motor 3 by obtaining information such as the rotation speed or torque of the rotor of the motor 3 based on the current detection signal Si from the current detection circuit 2c and the rotation position detection signals Hu, Hv, and Hw from the position sensors 4u, 4v, and 4w, and also generates the drive control signal Sd in order for the motor 3 to transition to the operating state specified by the drive command signal Sc, and sends the drive command signal Sc to the drive circuit 2. Furthermore, the control circuit 10 monitors the power supply voltage Vcc (power line Vcc) of the drive circuit 2, and when detecting a decrease in the power supply voltage Vcc, performs brake control described below.

The control circuit 10 is a program processing device (e.g., a microcontroller) has a configuration. In the configuration, for example, a processor such as a CPU, various storage devices such as RAM and ROM, and peripheral circuits such as a counter (timer), an A/D conversion circuit, a D/A conversion circuit, a clock generation circuit, and an input/output I/F circuit are connected to one another via a bus or a dedicated line.

In the motor drive control device 1, the control circuit 10 and the drive circuit 2 may be packaged as individual integrated circuit devices, or at least a part of the control circuit 10 and at least a part of the drive circuit 2 may be packaged as one integrated circuit device (IC).

Figure 2:
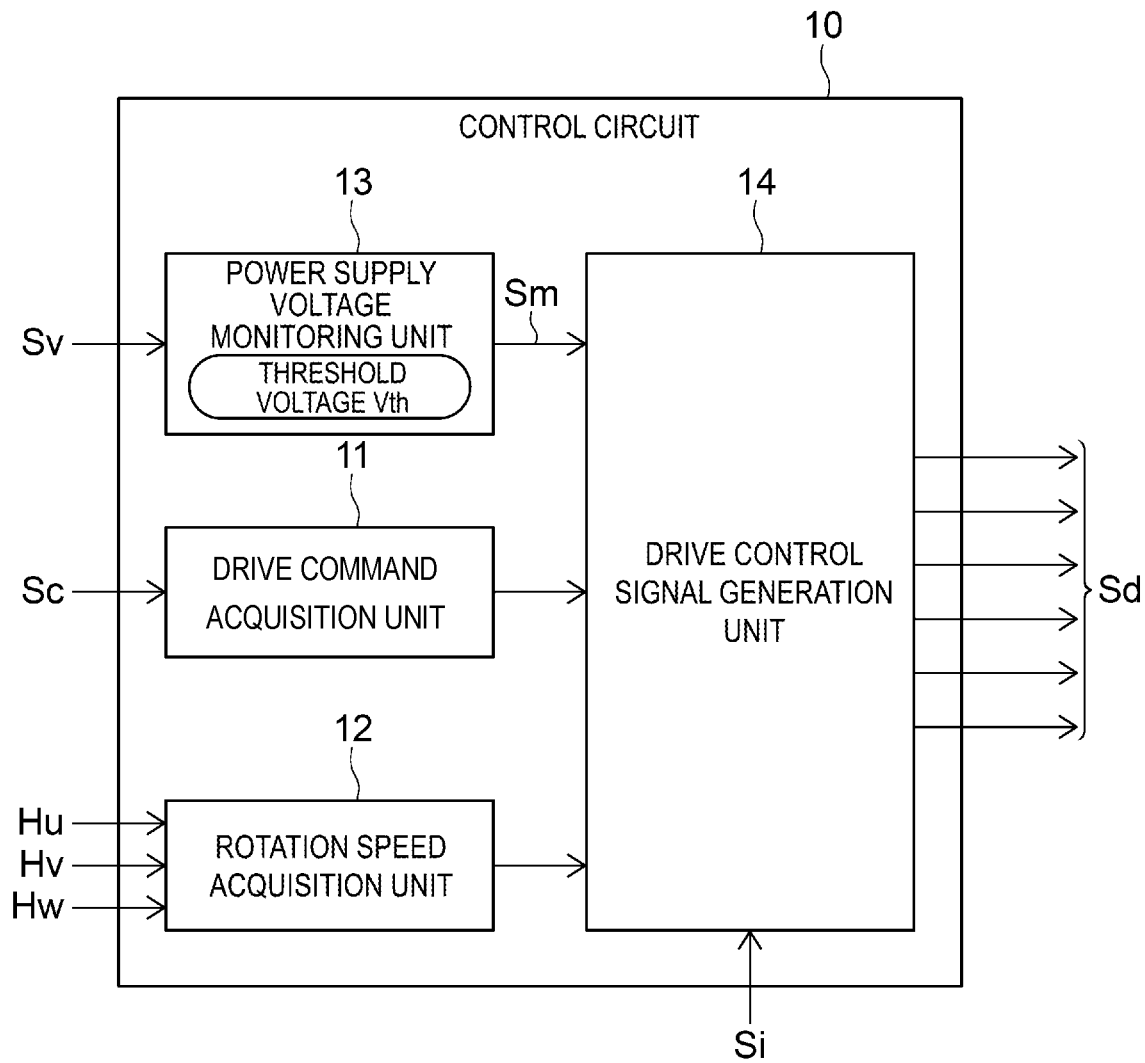
FIG. 2 is a diagram illustrating a functional block configuration of the control circuit in the motor drive control device according to the embodiment.

FIG. 2 is a diagram illustrating a functional block configuration of the control circuit 10 in the motor drive control device 1 according to the embodiment.

As illustrated in FIG. 2, the control circuit 10 includes, for example, a drive command acquisition unit 11, a rotation speed acquisition unit 12, a power supply voltage monitoring unit 13, and a drive control signal generation unit 14, as functional blocks for generating the drive control signal Sd.

These functional blocks are achieved, for example, in a program processing device as a control circuit 10, by a processor executing various arithmetic processes according to a program stored in a memory and controlling peripheral circuits such as a counter and an A/D conversion circuit. At least a part of these function blocks may be achieved by a dedicated hardware logic circuit.

The drive command acquisition unit 11 receives the drive command signal Sc from, for example, an external source, and analyzes the received drive command signal Sc to obtain a value specifying a target operating state of the motor 3 specified by the drive command signal Sc.

The drive command signal Sc includes a value indicating the target state of the operation of the motor 3. The drive command signal Sc is, for example, a signal output from a higher-level device for controlling the motor unit 100, and a higher-level device is provided external to the motor drive control device 1.

The drive command signal Sc is, for example, a speed command signal specifying the rotation speed of the rotor of the motor 3. For example, the drive command signal Sc contains the value the rotation speed as a target (target rotation speed) of the rotor of motor 3. The drive command signal Sc is, for example, a PWM signal having a duty ratio corresponding to a target rotation speed to be specified. The drive command acquisition unit 11 measures, for example, the duty ratio of the PWM signal as the drive command signal Sc, and outputs a rotation speed corresponding to the measured duty ratio as a target rotation speed.

The rotation speed acquisition unit 12 is a function unit for acquiring a measured value of the rotation speed of the rotor of the motor 3. The rotation speed acquisition unit 12 calculates the rotation speed of the rotor of the motor 3 through a known calculation method based on the rotation position detection signals Hu, Hv, and Hw output from the position sensors 4u, 4v, and 4w.

The power supply voltage monitoring unit 13 is a function unit for monitoring the power supply voltage Vcc of the drive circuit 2. The power supply voltage monitoring unit 13 measures the magnitude of the power supply voltage Vcc based on the voltage detection signal Sv output from the voltage detection circuit 6, determines whether the power supply voltage Vcc is lower than a threshold voltage Vth, and outputs a voltage determination signal Sm indicating the determination result. For example, when the power supply voltage Vcc is greater than the threshold voltage Vth, the power supply voltage monitoring unit 13 outputs the voltage determination signal Sm with the signal level a first logical level (e.g., low level), and when the power supply voltage Vcc is the threshold voltage Vth or less, outputs the voltage determination signal Sm with the signal level a second logical level (e.g., high level).

When the power supply voltage monitoring unit 13 detects the power supply voltage Vcc to be the threshold voltage Vth or less, the signal level of the voltage determination signal Sm may be fixed to the second logical level, or the threshold voltage Vth may be reset to a higher value (hysteresis characteristic). This can prevent frequent switching of signal level of the voltage determination signal Sm due to variations in the power supply voltage Vcc.

The drive control signal generation unit 14 is a function unit for generating the drive control signal Sd. The drive control signal generation unit 14 generates the drive control signal Sd based on at least one of the voltage determination signal Sm output from the power supply voltage monitoring unit 13, the target rotation speed output from the drive command acquisition unit 11, the rotation speed output from the rotation speed acquisition unit 12, and the current detection signal Si output from the current detection circuit 2c.

Here, the drive control signal Sd includes six PWM signals corresponding to the drive signals Vuh, Vvh, Vwh, Vul, Vvl, and Vwl for driving the respective drive transistors Q1 to Q6 of the inverter circuit 2a.

For example, when the power supply voltage Vcc is greater than the threshold voltage Vth (e.g., when the voltage determination signal Sm is low-level), the drive control signal generation unit 14 performs normal control. The normal control is, for example, control for generating a PWM signal with the duty ratio adjusted so that the target rotation speed matches the rotation speed output from the rotation speed acquisition unit 12 through a known arithmetic technique such as PID control arithmetic or vector control arithmetic, and outputs the PWM signal as the drive control signal Sd.

In the normal control, the drive control signal generation unit 14 may generate a PWM signal with a duty ratio adjusted so that the phase current based on the current detection signal Si does not exceed a predetermined value and output the PWM signal as the drive control signal Sd. On the other hand, when the power supply voltage Vcc is the threshold voltage Vth or less (e.g., voltage determination signal Sm is high), the drive control signal generation unit 14 performs brake control. The brake control generates the drive control signal Sd for periodically switching the low-side transistors Q2, Q4, and Q6 with the high-side transistors Q1, Q3, and Q5 turned off in a plurality of switching legs 20u, 20v, and 20w.

The drive control signal generation unit 14 continues the brake control from the control circuit 10 (power supply voltage monitoring unit 13) detecting the power supply voltage Vcc to be lower than the threshold voltage Vth (e.g., Vcc<Vth) until the control circuit 10 becomes inoperable.

Here, "the control circuit 10 becomes inoperable" refers to a state that the control circuit 10 cannot perform the function (specification) required as the control circuit 10 due to, for example, a decrease in the power supply voltage Vdd of the control circuit 10.

The brake control will be described below in detail with reference to the drawings.

Figure 3:
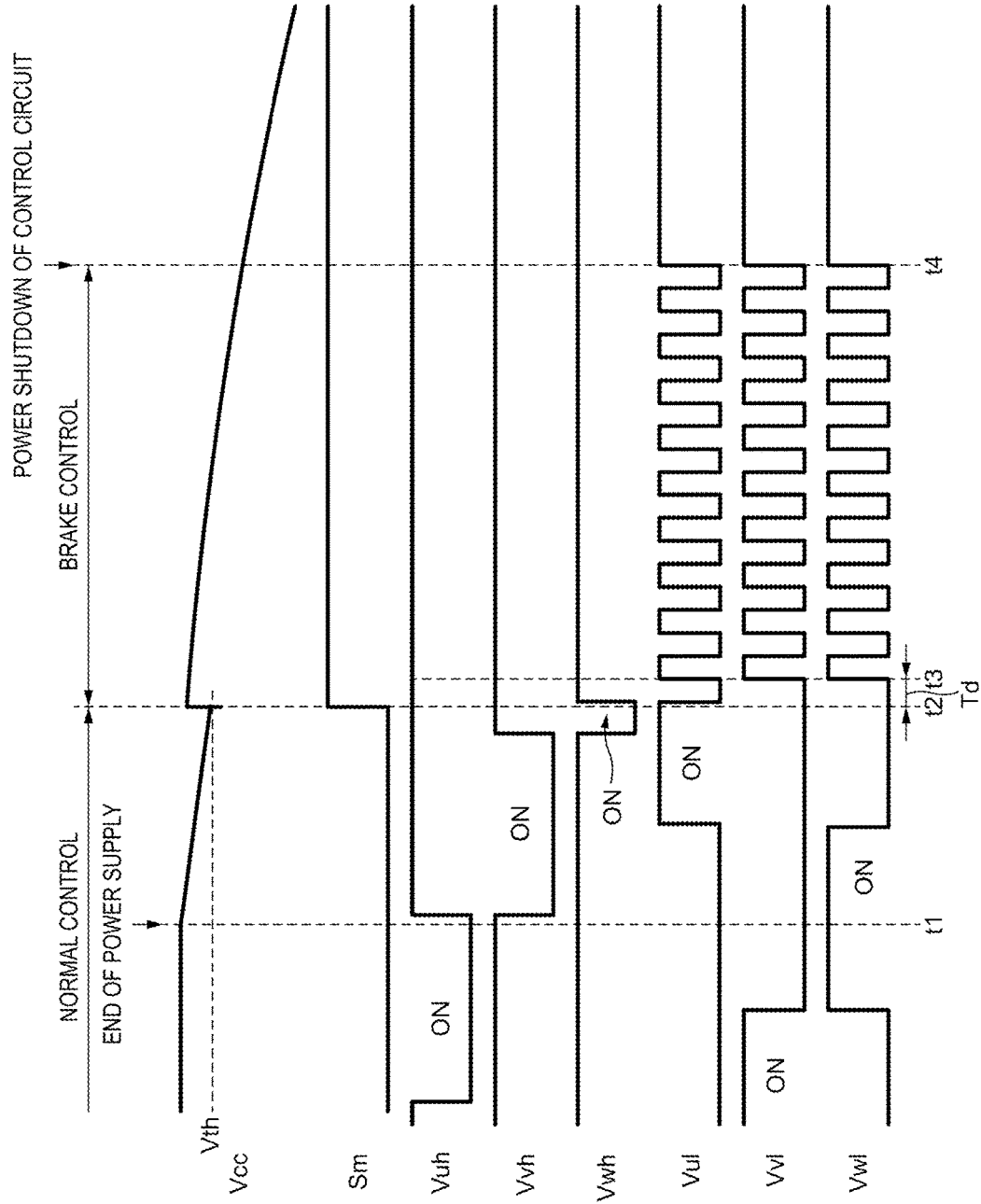
FIG. 3 is a timing chart illustrating an example of a drive signal in a brake control.

FIG. 3 is a timing chart illustrating an example of the drive signals Vuh, Vvh, Vwh, Vul, Vvl, and Vwl in the brake control.

In FIG. 3, the horizontal axis represents time, and the vertical axis represents the signal level of each signal. In FIG. 3, respective waveforms are illustrated from the top to the bottom of FIG. 3 for the power supply voltage Vcc, the voltage determination signal Sm, the drive signal Vuh of the high-side transistor Q1, the drive signal Vvh of the high-side transistor Q3, the drive signal Vwh of the high-side transistor Q5, the drive signal Vul of the low-side transistor Q2, the drive signal Vvl of the low-side transistor Q4, and the drive signal Vwl of the low-side transistor Q6.

For example, the high-side transistors Q1, Q3, and Q5 are turned off when the corresponding drive signals Vuh, Vvh, and Vwh are at a high level, and turned on when at a low level. For example, the low-side transistors Q2, Q4, and Q6 are turned off when the corresponding drive signals Vul, Vvl, and Vwl are at the low level, and turned on when at the high level.

Note that the respective voltage waveforms illustrated in FIG. 3 are schematic and different from the actual waveforms.

For example, as an initial state, a case is considered with the power supply voltage Vcc being larger than the threshold voltage Vth. In this case, the power supply voltage monitoring unit 13 outputs the low-level voltage determination signal Sm, and the drive control signal generation unit 14 generates the drive control signal Sd through the normal control and drives the motor 3.

Then, it is assumed that for example, at time t1 in FIG. 3, the supply of power (DC voltage) to the motor drive control device 1 from the outside is stopped. At this time, the voltage of the power line Vcc, that is, the power supply voltage Vcc, begins to decline slowly due to the stabilizing capacitor connected to the power line Vcc, or the like.

For example, when the power supply voltage Vcc becomes the threshold voltage Vth or less at time t2, the power supply voltage monitoring unit 13 switches the signal level of the voltage determination signal Sm from the low level to the high level. This causes the drive control signal generation unit 14 to change from the normal control to the brake control and generate the drive control signal Sd. More preferably, the drive control signal generation unit 14 switches from the normal control to the brake control and generates the drive control signal Sd after a period (dead time) for both of the high-side transistors Q1, Q3, Q5 and the low-side transistors Q2, Q4, Q6 to be turned off.

For example, at the time t2, the drive control signal generation unit 14, when detecting the signal level of the voltage determination signal Sm to have been switched from the low level to the high level, first turns off the high-side transistors Q1, Q3, Q5 and the low-side transistors Q2, Q4, Q6. Then, at time t3 when a predetermined time elapses from the time t2, the drive control signal generation unit 14 starts the brake control. In the brake control, the drive control signal generation unit 14 sets the drive signals Vuh, Vvh, and Vwh of the high-side transistors Q1, Q3, and Q5 to a high level, and sets the drive signals Vul, Vvl, and Vwl of the low-side transistors Q2, Q4, and Q6 to PWM signals with a predetermined duty ratio. Although not particularly limited, the duty ratio of the drive signals Vul, Vvl, and Vwl of the low-side transistors Q2, Q4, and Q6 in the brake control is preferably, for example, 50% or less. This prevents the power supply voltage Vcc from rising too much immediately after the start of the brake control.

Subsequently, the drive control signal generation unit 14 continues to generate the drive control signal Sd through the brake control until time t4 when the power supply voltage Vdd drops and the power supply of the control circuit 10 is shut off and the control circuit 10 becomes inoperable.

In the brake control, during a period when the low-side transistors Q2, Q4, and Q6 are on, the coils Lu, Lv, and Lw of respective phases are short-circuited to the ground potential. As a result, the motor 3 reaches a state with a brake (short brake) applied, so that the rotation speed of the motor 3 (rotor) is reduced.

On the other hand, in the brake control, during the period when the low-side transistors Q2, Q4, and Q6 are off, the rotor rotates by inertia. At this time, current flows from the coils Lu, Lv, and Lw of respective phases to the power line Vcc side, thereby increasing the power supply voltage Vcc. As a result, since the power supply voltage Vcc decreases slowly, the power supply voltage Vdd supplied from the voltage generation circuit 5 to the control circuit 10 also decreases slowly, making it possible to extend the period for the control circuit 10 to be capable of operating. That is, the period for performing the brake control is extended.

Thus, according to the brake control, braking the motor 3 (rotor) during the period when the low-side transistors Q2, Q4, and Q6 are turned on, and rotating the motor 3 (rotor) by inertia during the period when the low-side transistors Q2, Q4, and Q6 are turned off, are alternately repeated. This can sufficiently reduce the rotation speed of the motor 3 from when the power supply is shut off until when the operation of the control circuit 10 is stopped, thereby reducing the brake current after the operation of the control circuit 10 is stopped.

Figure 4A:
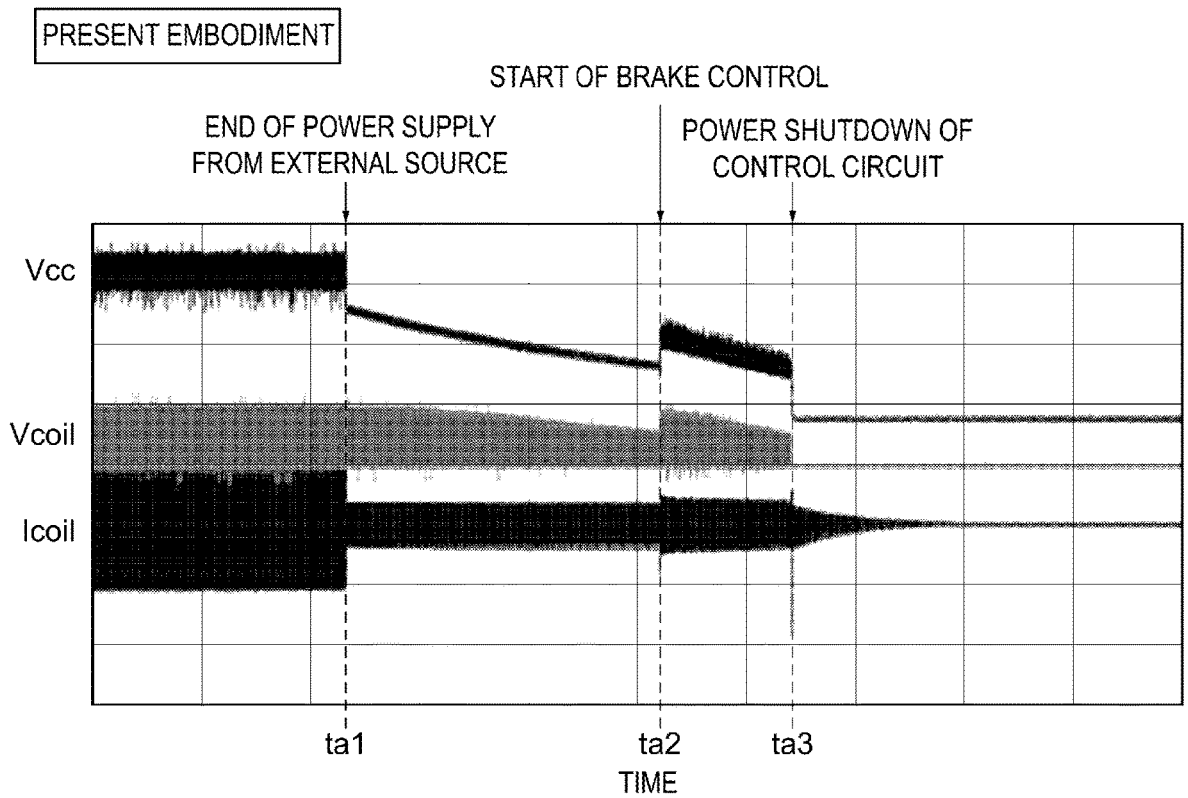
FIG. 4A is a diagram illustrating a simulation result of a current of a motor during power shutdown in the motor drive control device according to the embodiment.

FIG. 4A is a diagram illustrating a simulation result of the current of the motor when the power supply is shut down in the motor drive control device 1 according to the embodiment.

Figure 4B:
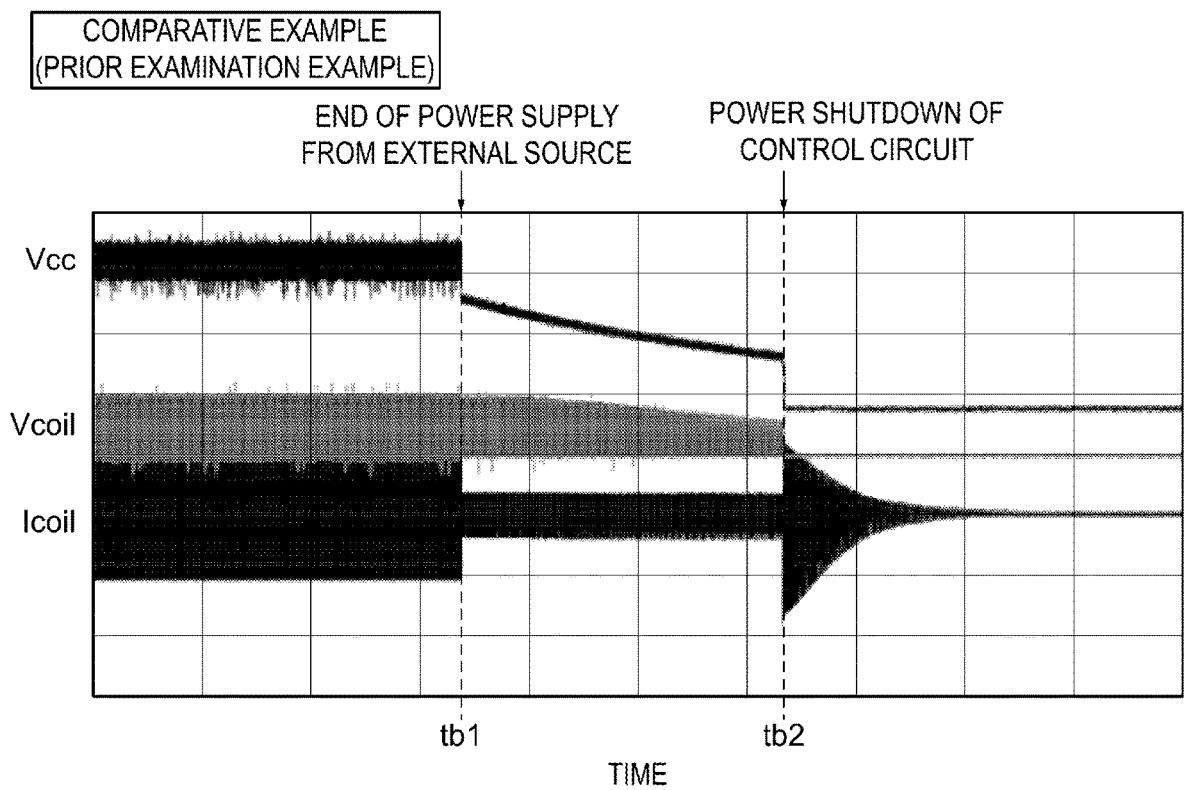
FIG. 4B is a diagram illustrating a simulation result of the current of the motor when a power supply is shut off in the motor drive control device (Comparative Example) according to a prior examination example by the present inventors.

FIG. 4B is a diagram illustrating a simulation result of the current of the motor when the power supply is shut down in the motor drive control device (Comparative Example) according to the prior examination example by the present inventors.

In FIGS. 4A and 4B, the horizontal axis represents time and the vertical axis represents the signal level of each signal. In FIGS. 4A and 4B respective waveforms are illustrated for the power supply voltage Vcc, a voltage Vcoil between the two phase coils, and a phase current Icoil of the coil are illustrated from the top to the bottom of FIGS. 4A and 4B.

As illustrated in FIG. 4B, according to the motor drive control device of the prior examination example by the present inventors, when the power supply from an external source is stopped at time tb1 and the control circuit (microcomputer) is powered off at time tb2, the rotation speed of the motor does not decrease sufficiently because the brake control is not performed. Thus, at the time tb2, the low-side transistors of the inverter circuit are forcibly turned on by the pull-up resistors so that a large brake current (coil current) flows.

On the other hand, as illustrated in FIG. 4A, the motor drive control device 1 according to the present embodiment allows the brake current of the motor generated after the power shutdown of the control circuit 10 to be smaller than the brake current of the prior examination example. Specifically, when the power supply from the outside stops at time ta1 and the power supply voltage Vcc becomes the threshold voltage or less at time ta2, the control circuit 10 starts brake control and switches the low-side transistors Q2, Q4, and Q6 by the PWM signal of the predetermined duty ratio with the high-side transistors Q1, Q3, and Q5 of the inverter circuit 2a turned off. As a result, the braking action of the motor 3 and the inertia rotation of the motor 3 are repeated, so that the rotation speed reduction of the motor 3 is accelerated.

Further, as described above, since the power supply voltage Vcc is gradually lowered through the brake control, the operation capable period of the control circuit 10 is longer than the operation capable period of the prior examination example. As a result, the period of the brake control is extended so that the reduction of the rotation speed is more accelerated.

Thereafter, when the control circuit 10 is shut down at time ta3, the low-side transistors Q2, Q4, and Q6 of the inverter circuit 2a are forcibly turned on by the pull-up resistors in the same manner as in the prior examination example, causing the brake current to flow. At this time, since the rotation speed of the motor 3 is sufficiently reduced, as illustrated in FIG. 4A, the brake current becomes substantially smaller than the brake current of the prior examination example.

Figure 5:
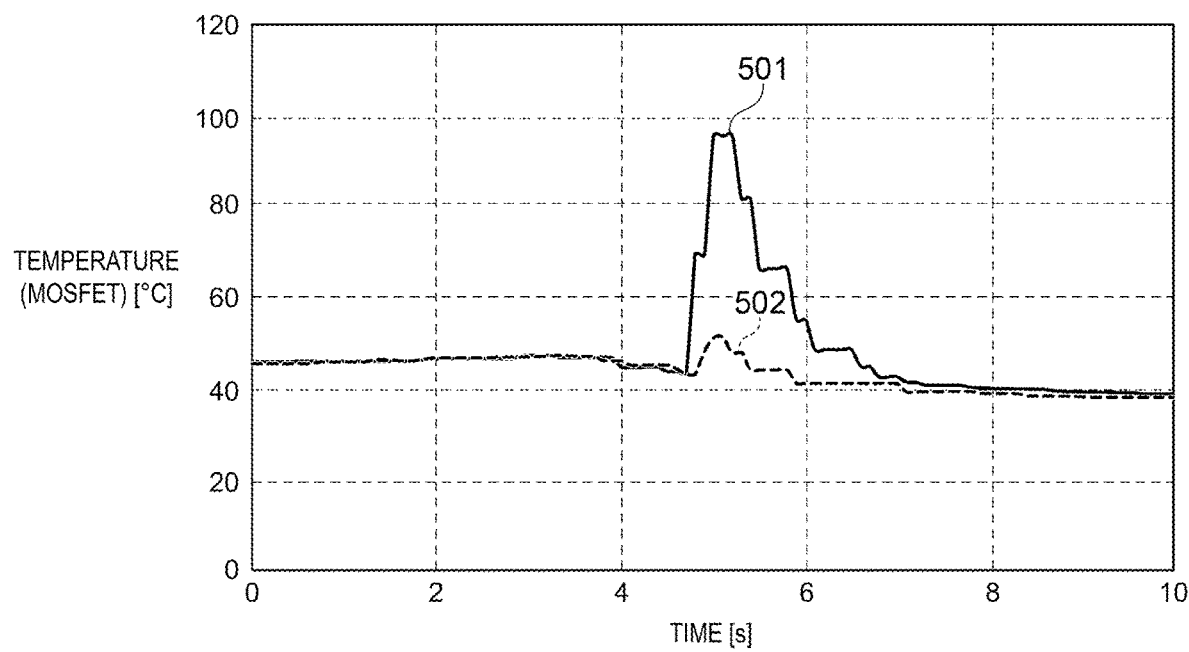
FIG. 5 is a diagram illustrating an example of a temperature change of a low-side transistor of an inverter circuit during the power shutdown.

FIG. 5 is a diagram illustrating an example of a temperature change of the low-side transistor of the inverter circuit during the power shutdown.

In FIG. 5, the horizontal axis represents time and the vertical axis represents temperature. A reference numeral 501 indicates a change in the maximum temperature of the low-side transistor of the inverter circuit before and after the power shutdown in the motor drive control device according to the prior examination example, and a reference numeral 502 indicates a change in the maximum temperature of the low-side transistor of the inverter circuit before and after the power supply is shut down in the motor drive control device 1 according to the present embodiment.

As will be understood from FIG. 5, the motor drive control device 1 according to the present embodiment enables the brake current of the motor 3 flowing in the low-side transistors after the power shut off to be greatly suppressed as described above, so that the temperature rise of the low-side transistors can be suppressed as compared to the prior examination example.

As described above, the motor drive control device 1 according to the present embodiment includes the pull-up resistors Ru2, Ru4, and Ru6 connected between the control electrodes Vul, Vvl, and Vwl of the low-side transistors Q2, Q4, and Q6 of the inverter circuit 2a for driving the motor 3, and the power line Vcc. When the power supply voltage Vcc is lower than the threshold voltage Vth, the motor drive control device 1 performs the brake control to generate the drive control signal Sd for turning off the high-side transistors Q1, Q3, and Q5 and periodically switching the low-side transistors Q2, Q4, and Q6 of the inverter circuit 2a.

Accordingly, as described above, this can sufficiently reduce the rotation speed of the motor 3 since the braking operation of the motor 3 and the inertia rotation of the motor 3 are alternately repeated from when the power supply to the motor drive control device 1 stops until when the power shutdown of the control circuit 10 occurs. As a result, when the low-side transistors Q2, Q4, and Q6 are forced on by the pull-up resistors Ru2, Ru4, and Ru6 after the power shutdown, the brake current flowing to the motor 3 can be suppressed.

Thus, the motor drive control device 1 according to the present embodiment can suppress the brake current while quickly stopping the motor 3 during the power shutdown.

In addition, the control circuit 10 continues the brake control from when detecting the power supply voltage Vcc to be lower than the threshold voltage Vth until when becoming inoperable. As a result, this enables the period during the brake control is performed to be extended as long as possible, so that the rotation speed of the motor 3 can be reduced further.

Further, the motor drive control device 1 according to the present embodiment enables the components for controlling the motor to be easily arranged in a limited space on the control board, since the booster circuit for driving the inverter circuit 2a is not required.

Expansion of Embodiments

The invention made by the present inventors is specifically described above based on the embodiments, but the disclosure is not limited thereto, and it goes without saying that the disclosure can be changed in various ways within the scope not departing from the gist of the disclosure.

For example, in the above embodiments, a case is illustrated, but is not limited to, that the control circuit 10 continues the brake control from detecting the power supply voltage Vcc to be lower than the threshold voltage Vth until the control circuit 10 becoming inoperable. Specifically, the control circuit 10 may continue the brake control for a predetermined period after detecting the power supply voltage Vcc to be lower than the threshold voltage Vth. For example, information for specifying the performance period of the brake control is stored in advance in a storage device (not illustrated) in the control circuit 10. The control circuit 10 starts timing by the timer with the start of the brake control, and stops the brake control when the measurement time reaches the performance period stored in the storage device. This allows the motor unit 100 to perform the brake control for an appropriate period of time depending on the application thereof. Further, by rewriting the information for specifying the performance period of the brake control, the user or the like can freely set the performance period of the brake control.

In the above embodiments, a case is illustrated. In the case, the rotation speed of the motor 3 is calculated based on position detection signals from the position sensors 4u, 4v, and 4w, but is not limited hereto. The control circuit 10 (rotation speed acquisition unit 12) may calculate the rotation speed through an arithmetic operation based on known sensorless control of the motor. In this case, the position sensors 4u, 4v, and 4w are not required.

In the above embodiments, a technique is illustrated for detecting each phase current through a shunt resistor connected in series to the inverter circuit 2a as the current detection circuit 2c, but each phase current may be detected by other known current detection techniques. For example, each phase current may be detected by a shunt resistor provided between the coil of each phase and the point of each drive transistor of the inverter circuit 2a commonly connected (triple shunt method). When the motor unit 100 is used for an application not requiring the current detection, the current detection circuit 2c need not be provided.

In the above embodiments, a case is illustrated. In the case, the drive command signal Sc is a speed command signal including a target value (target rotation speed) of the rotation speed of the motor 3, but is not limited hereto. For example, drive command signal Sc may be a torque command signal specifying the torque of the motor 3.

In the above embodiments, the number of phases of the motor 3 driven by the motor drive control device is not limited to three phases.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A motor drive control device, comprising:
a control circuit configured to output a drive control signal for driving a motor, the motor including multiphase coils; and
a drive circuit configured to drive the multiphase coils based on the drive control signal output from the control circuit, wherein
the drive circuit includes an inverter circuit including a plurality of switching legs configured to drive the multiphase coils, pull-up resistors, and a pre-drive circuit,
each of the plurality of switching legs includes a high-side transistor and a low-side transistor connected in series between a power line supplying a power supply voltage and a ground potential,
a node commonly connecting the low-side transistor and the high-side transistor is connected to one end of a corresponding one of the multiphase coils,
the low-side transistor and the high-side transistor each include a control electrode controlling an on/off of the low-side transistor and the high-side transistor,
the pull-up resistors are connected between the control electrode of the low-side transistor and the power line,
the pre-drive circuit drives the control electrode of the low-side transistor and the control electrode of the high-side transistor in response to the drive control signal, and
the control circuit performs brake control to generate the drive control signal for turning off the high-side transistor and periodically switching the low-side transistor in each of the plurality of switching legs, when detecting the power supply voltage to be lower than a threshold voltage.

2. The motor drive control device according to claim 1, wherein the control circuit continues the brake control from detecting the power supply voltage to be lower than the threshold voltage until the control circuit becoming inoperable.

3. The motor drive control device according to claim 1, wherein the control circuit continues the brake control for a predetermined period from detecting the power supply voltage to be lower than the threshold voltage.

4. The motor drive control device according to claim 1, wherein a signal, among the drive control signal for turning off the high-side transistor and periodically switching the low-side transistor, for driving the low-side transistor has a duty ratio of 50% or less.

5. A motor unit, comprising:
the motor drive control device according to claim 1; and
the motor.

* * * * *